(12) United States Patent
Kanemoto et al.

(10) Patent No.: US 12,202,145 B2
(45) Date of Patent: Jan. 21, 2025

(54) ROBOTIC SYSTEM WITH OBJECT UPDATE MECHANISM AND METHODS FOR OPERATING THE SAME

(71) Applicant: MUJIN, Inc., Tokyo (JP)

(72) Inventors: Yoshiki Kanemoto, Tokyo (JP); Rosen Nikolaev Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 267 days.

(21) Appl. No.: 17/841,545

(22) Filed: Jun. 15, 2022

(65) Prior Publication Data

US 2023/0025647 A1 Jan. 26, 2023

Related U.S. Application Data

(60) Provisional application No. 63/225,346, filed on Jul. 23, 2021.

(51) Int. Cl.
*B25J 9/16* (2006.01)
*B65G 47/90* (2006.01)

(52) U.S. Cl.
CPC .......... *B25J 9/1664* (2013.01); *B25J 9/1612* (2013.01); *B25J 9/1638* (2013.01); *B25J 9/1653* (2013.01); *B25J 9/1697* (2013.01); *B65G 47/905* (2013.01)

(58) Field of Classification Search
CPC ...... B25J 9/1664; B25J 9/1612; B25J 9/1638; B25J 9/1653; B25J 9/1697; B25J 9/1687; B65G 47/905; B65G 1/00; B65G 67/20; B65G 47/917; G05B 2219/40006
USPC ................ 700/245–264; 318/568.11–568.25
See application file for complete search history.

(56) References Cited

U.S. PATENT DOCUMENTS

| | | | | |
|---|---|---|---|---|
| 4,613,269 A | * | 9/1986 | Wilder | G06T 7/11 414/730 |
| 6,055,462 A | * | 4/2000 | Sato | B25J 9/1687 700/217 |
| 7,266,422 B1 | * | 9/2007 | DeMotte | B25J 9/1687 414/801 |
| 8,290,617 B2 | * | 10/2012 | Ruge | B65G 61/00 700/217 |

(Continued)

FOREIGN PATENT DOCUMENTS

| JP | 2003148914 A | 5/2003 |
|---|---|---|
| JP | 2017045081 A | 3/2017 |

(Continued)

OTHER PUBLICATIONS

First Office Action received for Japanese Application No. 2022-115234, mailed Sep. 7, 2022, 16 pages with translation.

(Continued)

*Primary Examiner* — Jaime Figueroa
(74) *Attorney, Agent, or Firm* — Perkins Coie LLP (57) ABSTRACT

A system and method for determining a misdetection of an object and subsequent response is disclosed. A robotic system may use a motion plan, which is derived based on an initial detection result of a package, to transfer the package from a start location to a task location. During implementation of the motion plan, the robotic system may obtain additional sensor data, which can be used to deviate from the initial motion plan and implement a replacement motion plan to transfer the package to the task location.

20 Claims, 6 Drawing Sheets

(56) References Cited

U.S. PATENT DOCUMENTS

| | | | |
|---|---|---|---|
| 8,489,229 B2* | 7/2013 | Kuehnemann | B65G 57/00 |
| | | | 700/214 |
| 9,205,562 B1* | 12/2015 | Konolige | B25J 9/1687 |
| 9,315,344 B1* | 4/2016 | Lehmann | B65G 61/00 |
| 9,327,397 B1* | 5/2016 | Williams | B65G 1/137 |
| 9,505,129 B2* | 11/2016 | Yamamoto | B25J 9/1676 |
| 9,579,798 B2* | 2/2017 | Wang | B25J 9/1694 |
| 9,796,540 B1* | 10/2017 | Shellenbaum | B25J 15/0014 |
| 10,053,305 B2* | 8/2018 | Eto | B65G 61/00 |
| 10,343,857 B2* | 7/2019 | Morency | B65G 59/02 |
| 10,369,701 B1* | 8/2019 | Diankov | G06T 7/001 |
| 10,471,597 B1* | 11/2019 | Murphy | B25J 9/1674 |
| 10,696,493 B1* | 6/2020 | Diankov | B65G 1/0485 |
| 11,007,648 B2* | 5/2021 | Wertenberger | B25J 9/1697 |
| 11,319,166 B2* | 5/2022 | Diankov | B65G 1/0485 |
| 11,413,762 B2* | 8/2022 | Sirkett | B25J 19/023 |
| 11,565,406 B2* | 1/2023 | Yerazunis | B25J 15/12 |
| 2006/0112034 A1* | 5/2006 | Okamoto | G05D 1/0274 |
| | | | 706/16 |
| 2009/0069939 A1* | 3/2009 | Nagatsuka | B25J 9/1671 |
| | | | 901/50 |
| 2010/0222915 A1* | 9/2010 | Kuehnemann | G06Q 10/08 |
| | | | 706/14 |
| 2011/0122231 A1* | 5/2011 | Fujieda | G06T 7/593 |
| | | | 348/47 |
| 2014/0374216 A1* | 12/2014 | Pierson | B65G 47/2445 |
| | | | 198/416 |
| 2015/0073588 A1* | 3/2015 | Priebe | B65G 57/00 |
| | | | 700/217 |
| 2015/0166272 A1* | 6/2015 | Pankratov | G06Q 10/08 |
| | | | 700/217 |
| 2015/0203304 A1* | 7/2015 | Morency | B65G 61/00 |
| | | | 414/797 |
| 2016/0016311 A1* | 1/2016 | Konolige | B25J 9/1664 |
| | | | 901/30 |
| 2016/0063309 A1* | 3/2016 | Konolige | G06T 1/0014 |
| | | | 901/14 |
| 2016/0089790 A1* | 3/2016 | Wang | B25J 9/1694 |
| | | | 700/255 |
| 2016/0297611 A1* | 10/2016 | Williams | B25J 3/00 |
| 2016/0347558 A1* | 12/2016 | Eto | B65G 59/04 |
| 2019/0070734 A1* | 3/2019 | Wertenberger | B25J 15/0616 |
| 2019/0389070 A1* | 12/2019 | Sirkett | B25J 9/1679 |
| 2020/0139553 A1* | 5/2020 | Diankov | G06T 7/66 |
| 2020/0377311 A1* | 12/2020 | Diankov | B65G 57/00 |
| 2022/0161427 A1* | 5/2022 | Yerazunis | B25J 9/1674 |

FOREIGN PATENT DOCUMENTS

| | | |
|---|---|---|
| JP | 2020069640 A | 5/2020 |
| JP | 2020196610 A | 12/2020 |

OTHER PUBLICATIONS

Second Office Action received for Japanese Application No. 2022-115234, mailed Oct. 14, 2022, 15 pages with translation.

Third Office Action received for Japanese Application No. 2022-115234, mailed Nov. 29, 6 pages with translation.

Decision to Grant for Japanese Application No. 2022-115234.

* cited by examiner

ROBOTIC SYSTEM WITH OBJECT UPDATE MECHANISM AND METHODS FOR OPERATING THE SAME

CROSS-REFERENCE TO RELATED APPLICATION(S)

The present application claims the benefit of U.S. Provisional Patent Application No. 63/225,346, filed Jul. 23, 2021, the entirety of which is incorporated herein by reference.

TECHNICAL FIELD

The present technology is directed generally to robotic systems and, more specifically, robotic systems with object update mechanism.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate human sensitivity and/or adaptability required for executing more complex tasks. For example, robots often have difficulty adapting to unexpected conditions, such as due to incorrect object identification. Accordingly, there remains a need for improved robotic systems and techniques for controlling and managing various aspects of the robots to handle unexpected conditions.

DETAILED DESCRIPTION

Systems and methods for transferring unexpected objects are described herein. The system can include or access registration records that describes a set of traits (e.g., physical characteristics, such as surface images, dimensions, weight, Center of Mass (CoM) location, or the like) for each expected object. The system can include and/or communicate with a set of sensors (e.g., visual sensors, weight/torque sensors, or the like) that can obtain measurements or representations objects that correspond to the set of traits. For example, the system may interact with one or more cameras to obtain two-dimensional (2D) and/or three-dimensional (3D) images or depth maps of one or more objects at a start location. The obtained images can be processed by a detection process, which may include locating edges of objects, estimating or measuring dimensions of objects, determining an identity of the object, determining a location of the object, and/or the like. The detection results can be used to derive a motion plan for transferring each object from the start location to a task location. As described in detail below, the system may obtain other measurements, such as weight measurements and/or corresponding torque vectors via one or more weight and/or torque sensors on end-effectors and robotic arms, during implementation of the derived motion plan. The system can compare the obtained measurements to expected data to verify the detected identity of the object. When the measurements and the expected data do not match, the system can process the obtained measurements, such as the weight and/or torque vectors, to estimate or calculate the CoM of the targeted object. In some embodiments, the dynamically obtained CoM can be used to transfer the target object, such as by updating the existing motion plan with the CoM and/or without recomputing the motion planning overall.

During operation, the system may expect two or more objects having similar physical characteristics (e.g., differences in lengths and widths of the objects are within a predetermined threshold range). Alternatively or additionally, the system may receive or encounter an object that is not registered but having similar physical characteristics as one or more of the registered objects. In processing such similar objects, the system may erroneously detect/identify the targeted/imaged object. As an illustrative example, an object 'A' and an object 'B' may have lengths and widths that may not be consistently distinguishable (e.g., from a top view of the two objects given a hardware and/or a software granularity or capacity of the system) while having different heights and/or weights. Accordingly, the system may mistakenly identify an actual object 'A' as object 'B'.

The erroneous detection can cause the system to rely on and/or expect other erroneous parameters for subsequent processing, such as in deriving and/or implementing motion plans to transfer the misidentified object. For example, the misdetection may cause the system to rely on an erroneous height measure, which can cause an unexpected collision during transfer of the erroneously detected object. Also, the detection error can cause the system to rely on an erroneous weight, which may cause a grip failure and piece loss during transfer.

To prevent such down-stream failures, the system can use deviations in expected values to identify and adjust for the detection errors. Continuing with the illustrative example, the objects 'A' as object 'B' can have other differing physical aspects, such as heights, weights, and/or CoMs. When the system implements the motion plan for object 'B' resulting from the erroneous detection, the system can expect the corresponding weight and/or torque vectors (e.g., CoMs) for object 'B.' When corresponding measurements from the actual object 'A' is received (e.g., different from the expected parameters), the system can determine an error condition and/or determine that the initial detection of the target object may be erroneous.

In some embodiments, the system can respond to the erroneous detection by deriving an estimated geometry of the grasped object, such as by enlarging or shrinking a footprint (e.g., the length and/or the width) of the grasped object according to the actual measurement (e.g., the CoM). For example, the system can use the grasped location as a reference and adjust the lateral dimensions of the grasped object such that the actual CoM is at a central portion of the adjusted footprint. In one or more embodiments, the system may be configured to release the object and then regrip the object over the actual CoM. Additionally or alternatively, the system can determine the height of the grasped object, such as using a crossing sensor located along the transfer path (e.g., above the start location or above the destination location) and/or a side-view camera.

In some embodiments, the system can update one or more statuses and/or remove one or more initial portions for the corresponding motion plan based on the actual CoM (e.g., without rederiving the overall motion plan) to account for the differences in the initial grip location and the adjusted grip location. Alternatively, the system can use the detected actual aspects and/or the adjusted footprint to derive an updated motion plan, such as when the differences exceed one or more predetermined threshold parameters. Moreover, the system can use the actual measurements to update the registration records, such as by registering a new object or updating the records for the initially-detected object. Continuing with the illustrative example described above, the system can create a new registration record for the object 'A' using the measured weight/torque vectors, the CoM, the new height, and/or the like. Alternatively, the system can update the record for the object 'B' to include the measured weight/torque vectors, the CoM, the new height, and/or the like.

Using real-time/actual measurements, the robotic system can provide effective verification of object detection. Accordingly, the robotic system can increase throughput by reducing or eliminating errors caused by object misdetection. Moreover, the robotic system can implement automatic responses, such as by replanning the motion without operator input, to recover from the misdetection and successfully transfer the mis-detected object to the task location. Accordingly the robotic system can increase efficiency and overall transfer speed by eliminating the need for human verifications or operator-provided response instructions.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, or the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

Figure 1:
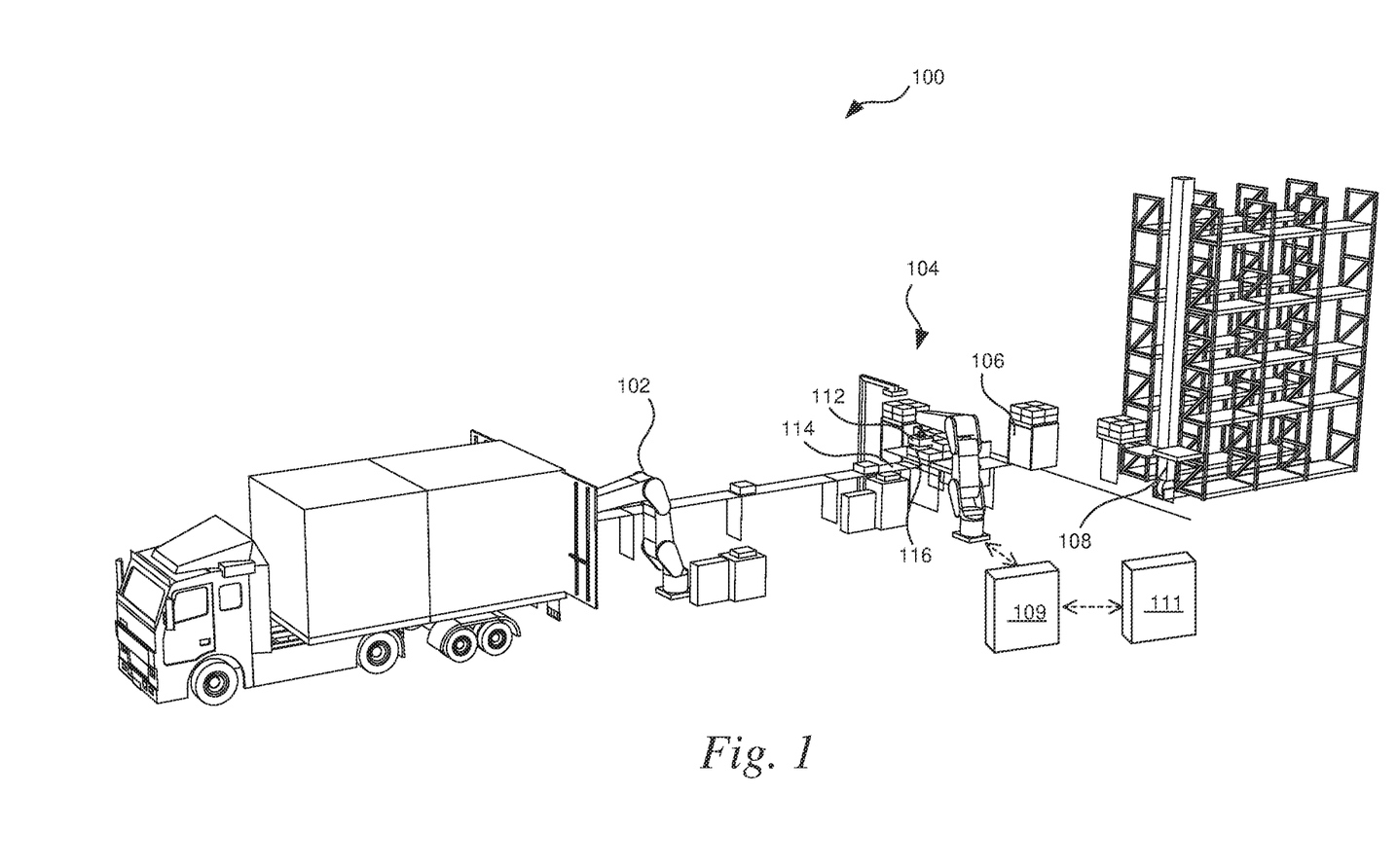
FIG. 1 illustrates an example environment in which a robotic system transports objects in accordance with one or more embodiments of the present technology.

FIG. 1 is an illustration of an example environment in which a robotic system 100 transports objects in accordance with one or more embodiments of the present technology. The robotic system 100 can include and/or communicate with one or more units (e.g., robots) configured to execute one or more tasks. Aspects of the object detection/update can be practiced or implemented by the various units.

For the example illustrated in FIG. 1, the robotic system 100 can include and/or communicate with an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a task location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task), such as to move the target object 112 from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves). Details regarding the task and the associated actions/computations are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include and/or communicate with other units, such as manipulators, service robots, modular robots, etc., not shown in FIG. 1. For example, in some embodiments, other units can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include a controller 109 coupled to physical or structural members (e.g., robotic manipulator arms) that are connected at joints for motion (e.g., rotational and/or translational displacements). The controller 109 can include a device and/or a circuit (e.g., one or more processors and/or one or more memories) configured to control one or more aspects of implementing the task. The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include and/or communicate with (via, e.g., the controller 109) the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic units can include transport motors configured to transport the corresponding units/chassis from place to place.

The robotic system 100 can include and/or communicate with sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). The robotic system 100 can process the digital image and/or the point cloud to identify the target object 112, the start location 114, the task location 116, a pose of the target object 112, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

The robotic system 100 can further include or be communicatively coupled to one or more devices 111 that are separate from the controller 109. For example, the additional devices 111 (e.g., one or more computing devices or subsystems), such as a warehouse management system overseeing the overall management and/or stock records of the location, a delivery coordination system (e.g., an automated guided vehicle (AGV) control system, a conveyor control system, or the like), a sequencer controlling an order of tasks or associated objects, a motion planning system deriving a motion plan for each task, and/or the like. In other embodiments, the controller 109 may be configured to perform one or more such functions of the devices 111 (e.g., sequence derivation, motion planning, or the like).

Robotic Systems

Figure 2:
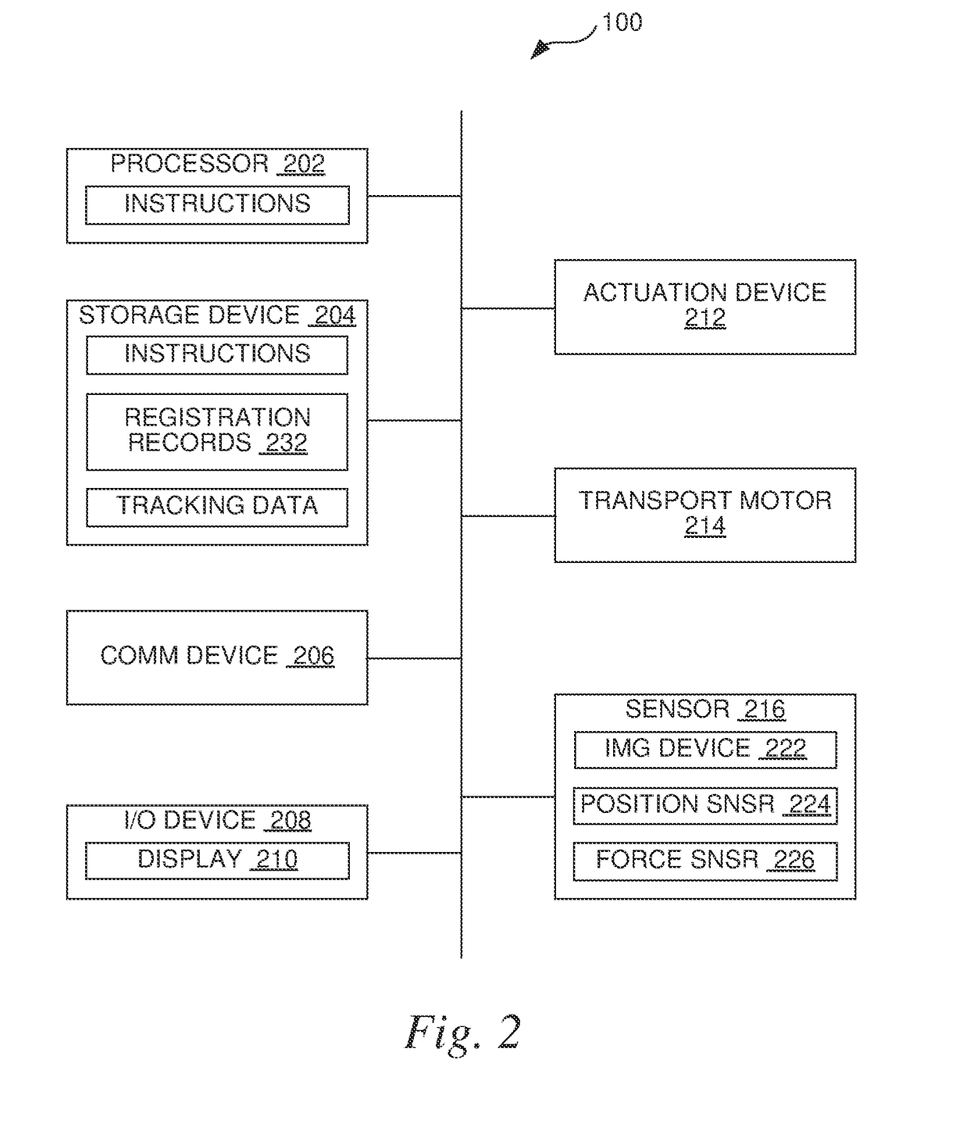
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, one or more units/components for the robotic system 100 and/or one or more of the robotic units can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include and/or communicate with bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results, templates (e.g., shape templates, grasp sets, or the like), and/or predetermined data/thresholds. For example, the storage devices 204 can include a registration database system (RDS) that stores registration records 232 (also referred to as master data). Each registration record 232 may include descriptions of a corresponding object (e.g., a box, a case, a container, and/or a product) that may be manipulated by the robotic system 100. The registration records 232 can include one or more physical characteristics or attributes, such as a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected mass or weight, or any combination thereof for one or more of the objects expected to be manipulated by the robotic system 100. The registration records 232 can further include manipulation-related information regarding the objects, such as a CoM location on each of the objects, one or more template Sis, expected sensor measurements (e.g., force, torque, pressure, and/or contact measurements) corresponding to one or more actions/maneuvers, vision data (e.g., reference radar/lidar data), or any combination thereof.

The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., the controller 109 of FIG. 1) can include the processors 202, storage devices 204, communication devices 206, and/or input-output devices 208. The controller can be a standalone component or part of a unit/assembly. For example, each unloading unit, a transfer assembly, a transport unit, and a loading unit of the system 100 can include one or more controllers. In some embodiments, a single controller can control multiple units or standalone components.

The robotic system 100 can include and/or communicate with physical or structural members (e.g., robotic manipulator arms) connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The kinetic chain can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the kinetic chain can include the transport motors 214 configured to transport the corresponding units/chassis from place to place. For example, the actuation devices 212 and transport motors connected to or part of a robotic arm, a linear slide, or other robotic component.

The sensors 216 can be configured to obtain information used to implement the tasks, such as for manipulating the structural members and/or for transporting the robotic units. The sensors 216 can include devices configured to detect or measure one or more physical properties of the controllers, the robotic units (e.g., a state, a condition, and/or a location of one or more structural members/joints thereof), and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., 2-dimensional and/or 3-dimensional imaging devices). configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target package 112, the start location 114, the task location 116, a pose of the target package 112, or a combination thereof. The robotic system 100 can use image data from the imaging device 222 to determine how to access and pick up objects. Images of the objects can be analyzed to determine a motion plan for positioning a vacuum gripper assembly to grip targeted objects. The robotic system 100 (e.g., via the various units) can capture and analyze an image of a designated area (e.g., inside the truck, inside the container, or a pickup location for objects on the conveyor belt) to identify the target package 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task. The unloading unit, transfer unit, transport unit/assembly, and the loading unit disclosed herein can include the sensors 216.

In some embodiments, the sensors 216 can include one or more force sensors 226 (e.g., weight sensors, strain gauges, piezoresistive/piezoelectric sensors, capacitive sensors, elastoresistive sensors, and/or other tactile sensors) configured to measure a force applied to the kinetic chain, such as at the end-effector. For example, the sensor 216 can be used to determine a load (e.g., the grasped object) on the robotic arm. The force sensors 226 can be attached to or about the end-effector and configured such that the resulting measurements represent a weight of the grasped object and/or a torque vector relative to a reference location. In one or more embodiments, the robotic system 100 can process the torque vector, the weight, and/or other physical traits of the object (e.g., dimensions) to estimate the CoM of the grasped object.

Robotic Transfer Assembly

Figure 3:
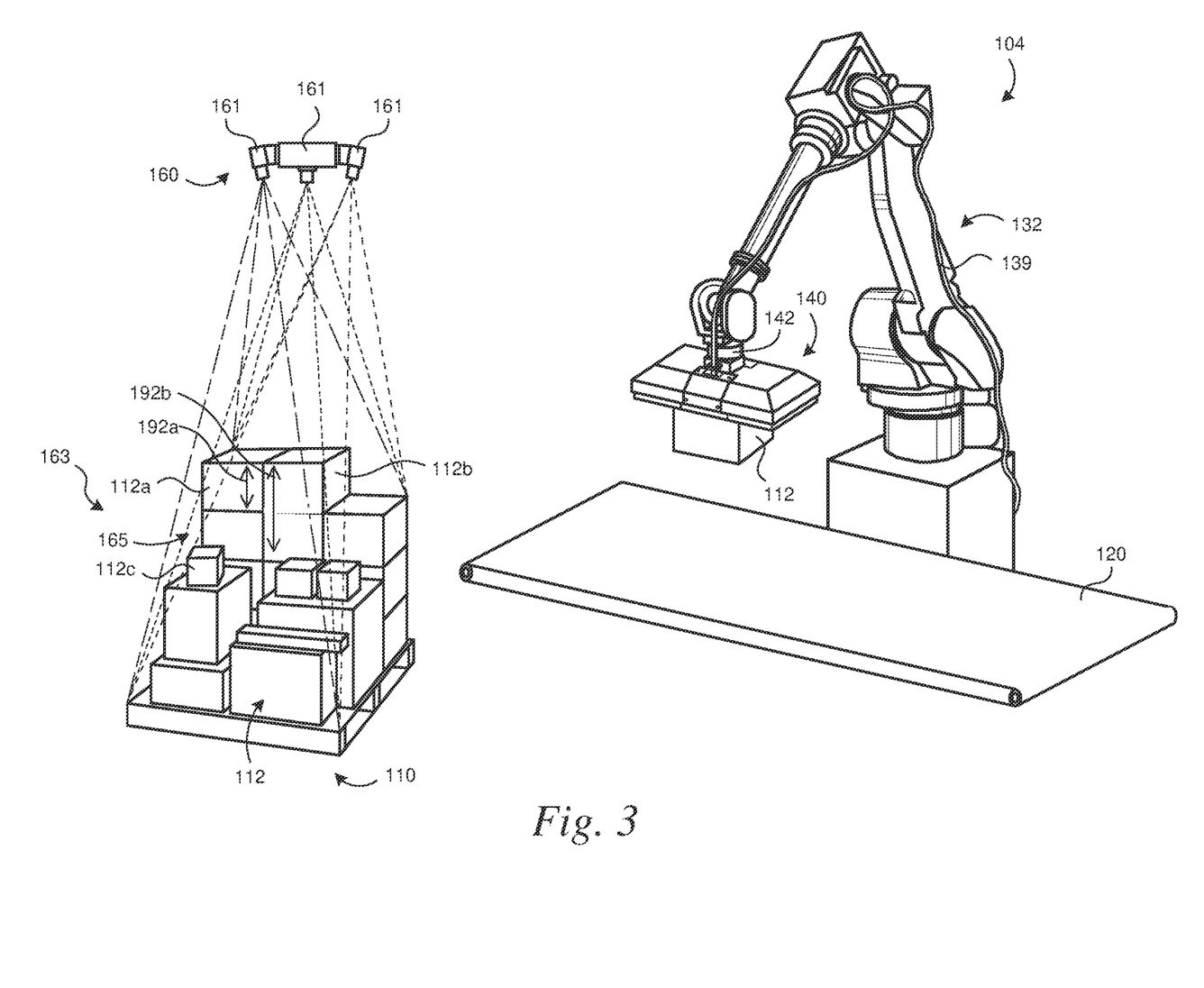
FIG. 3 illustrates a multi-component transfer assembly in accordance with one or more embodiments of the present technology.

FIG. 3 illustrates the transfer assembly 104 in accordance with one or more embodiments of the present technology. The transfer assembly 104 can include the imaging system 160 and a robotic arm system 132. The imaging system 160 can provide image data captured from a target environment with a de-palletizing platform 110. The robotic arm system 132 can include a robotic arm assembly 139 and an end effector 140 (e.g., a gripper assembly). The robotic arm assembly 139 can position the end effector 140 above a group of objects in a stack 165 located at a pickup environment 163.

FIG. 3 shows the end effector 140 carrying a single object or package 112 ("package 112") positioned above a conveyer 120. The end effector 140 can release the package 112 onto the task location 116 of FIG. 1, such as the conveyor belt 120, and the robotic arm system 132 can then retrieve the packages 112a, 112b by positioning the unloaded end effector 140 directly above both packages 112a, 112b. The end effector 140 can then hold, via a vacuum grip, one or more of packages 112a, 112b, and the robotic arm system 132 can carry the retained packages 112a and/or 112b to a position directly above the conveyor 120. The end effector 140 can then release (e.g., simultaneous or sequentially) the packages 112a, 112b onto the conveyor 120. This process can be repeated any number of times to carry the objects from the stack 165 to the conveyor 120.

With continued reference to FIG. 3, the de-palletizing platform 110 can include any platform, surface, and/or structure upon which a plurality of objects or packages 112 (singularly, "package 112") may be stacked and/or staged and ready to be transported. The imaging system 160 can include one or more imaging devices 161 configured to capture image data of the packages 112 on the de-palletizing platform 110. The imaging devices 161 can capture distance data, position data, video, still images, lidar data, radar data and/or motion at the pickup environment 163. It should be noted that, although the terms "object" and "package" are used herein, the terms include any other items capable of being gripped, lifted, transported, and delivered such as, but not limited to, "case," "box", "carton," or any combination thereof. Moreover, although polygonal boxes (e.g., rectangular boxes) are illustrated in the drawings disclosed herein, the shapes of the boxes are not limited to such shape but includes any regular or irregular shape that is capable of being gripped, lifted, transported, and delivered.

Like the de-palletizing platform 110, the receiving conveyor 120 can include any platform, surface, and/or structure designated to receive the packages 112 for further tasks/operations. In some embodiments, the receiving conveyor 120 can include a conveyor system for transporting the package 112 from one location (e.g., a release point) to another location for further operations (e.g., sorting and/or storage).

Mis-Identification Example(s)

Figure 4:
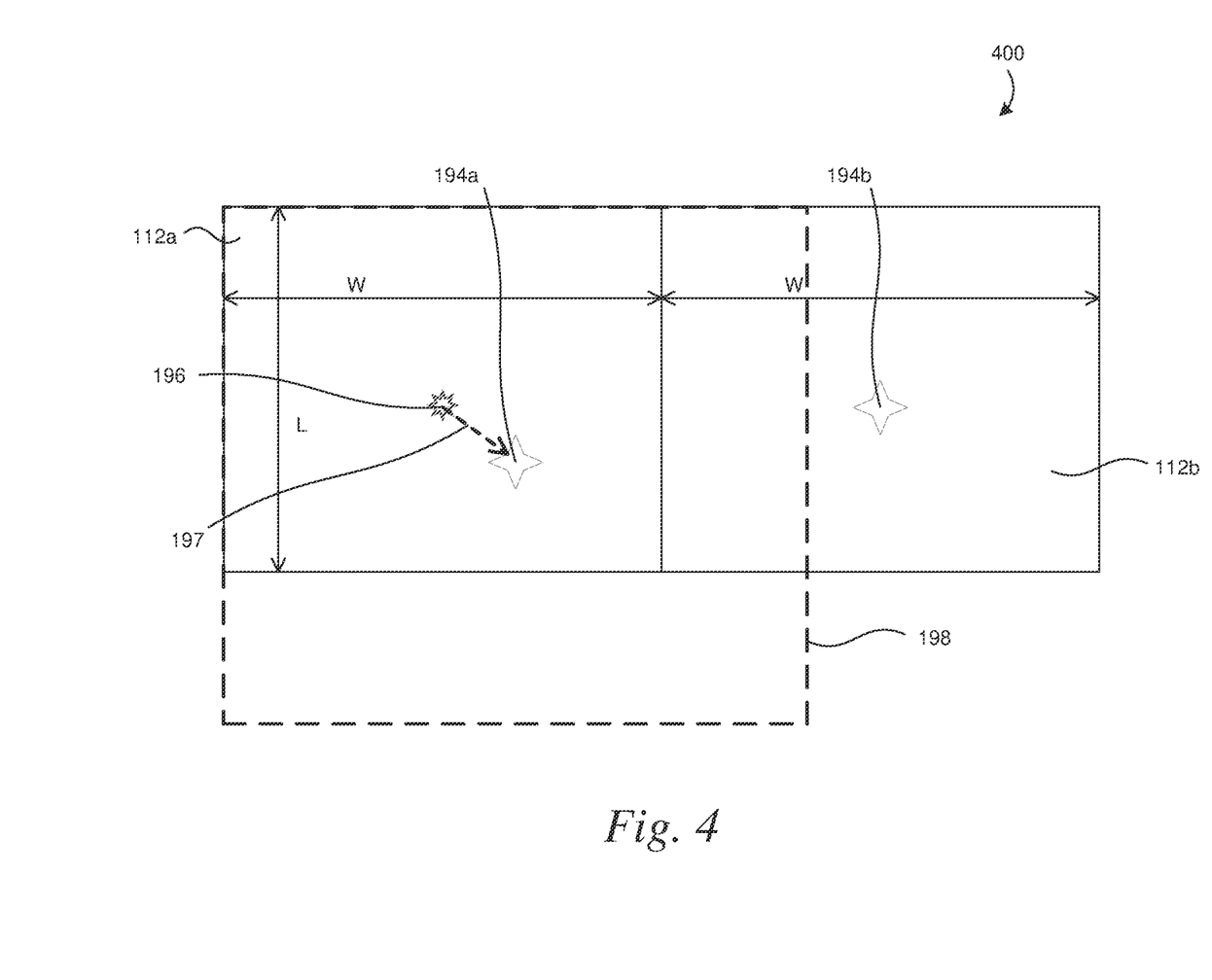
FIG. 4 illustrates an example top-view of a pair of packages in accordance with one or more embodiments of the present technology.

The robotic system 100 can be configured to respond to and process any misidentifications or erroneous detections of the packages 112. FIG. 4, illustrates an example top-view 400 (e.g., imaging data from the imaging system 160) of a pair of packages 112a and 112b in accordance with one or more embodiments of the present technology. Referring to FIG. 3 and FIG. 4 together, the imaging system 160 can include one or more downward-facing cameras configured to obtain corresponding top view(s) of the packages 112a and 112b. As such, the robotic system 100 may erroneously identify the packages 112a and 112b when they have similar lateral dimensions (e.g., lengths and widths). For example, the top-view image 400 can cause the robotic system 100 to mis-identify the package 112a as the package 112b. Accordingly, the robotic system 100 can derive a motions plan for the package 112a that erroneously accounts for a height 192b instead of a height 192a, a CoM 194b instead of a CoM 194a, or the like. For example, the motion plan may correspond to a grip location 196 that corresponds to (e.g., overlaps) the CoM 194b instead of the CoM 194a.

The robotic system 100 can implement at least an initial portion of the resulting motion plan, such as by grasping the package 112a at the grip location 196 and/or lifting the package 112a. The robotic system 100 can be configured to obtain a set of force measurements while and/or after initially lifting the package 112a. The obtained measurements can include an actual weight of the package 112a and/or a vector 197 (e.g., a torque vector) that corresponds to a difference between the actual CoM 194a and the grip location 196. The robotic system 100 can be configured to compare the obtained sensor outputs corresponding to the package 112a to the expected sensor outputs (e.g., the registered characteristics of the package 112b). When the compared outputs do not match, the robotic system 100 can detect a detection error.

In some embodiments, the robotic system 100 can calculate a difference between the expected and obtained values of the sensor outputs. When the calculated difference exceeds a predetermined maximum error condition, the robotic system 100 can signal a fail condition and/or notify an operator. Alternatively or additionally, the robotic system 100 can continue with the existing motion plan when the difference is below a predetermined minimum error condition.

The robotic system 100 may be configured to reprocess the package 112a under certain conditions, such as when the difference satisfies a predetermined range or a template. For example, the robotic system 100 can derive an estimated geometry 198 based on the vector 197, the expected dimensions, and/or the grip location 196. The robotic system 100 can derive the estimated geometry 198 such that the actual CoM 194a (e.g., an estimate thereof according to the vector 197) is located at a center portion of the estimated geometry 198. Also, the robotic system 100 can maneuver the robotic arm and/or implement a process to determine the actual height 192a of the package 112a. The robotic system 100 can use the estimated geometry, the estimated CoM, and/or the actual height to process the package 112a. For example, the robotic system 100 can use the updated measurements or parameters to re-derive a new/replacement motion plan and/or adjust the existing motion plan, such as by increasing the lift height, reducing a movement speed, releasing the package 112a and regripping at the actual CoM 194a, or the like. The robotic system 100 can further update the registration records 232, such as by creating a new record for the package 112a and/or updating the record for the package 112b with the newest results (by, e.g., replacing the height, the weight, the CoM, etc.).

Example System Connections

Figure 5:
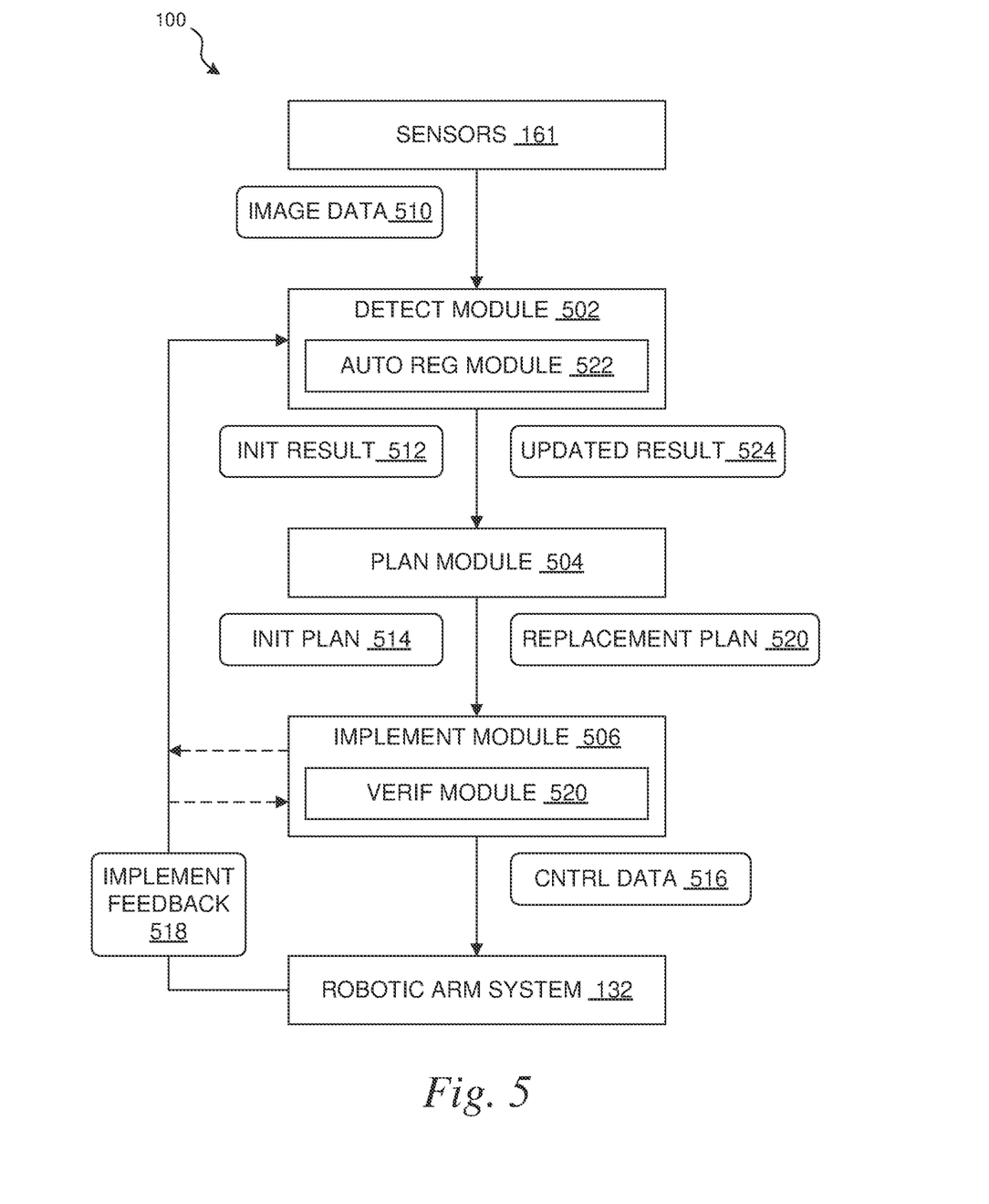
FIG. 5 is a functional block diagram of the robotic system in accordance with one or more embodiments of the present technology.

The robotic system 100 can implement a set of functions in initially processing the packages 112 and/or in responding to the erroneous object detection. FIG. 5 is a functional block diagram of the robotic system 100 in accordance with one or more embodiments of the present technology. The robotic system 100 can include a detection module 502, a planning module 504, and/or an implementation module 506 configured to process the packages 112 and respond to the erroneous detection. The robotic system 100 can implement the detection module 502, the planning module 504, and/or the implementation module 506 using the controller 109 of FIG. 1, one or more of the devices 111 of FIG. 1, one or more of the processors 202 of FIG. 2, or a combination thereof.

The detection module 502 can be configured to detect one or more of the packages 112. In some embodiments, the detection module 502 can process image data 510 received from the imaging devices 161. The detection module 502 can process the image data by extracting features, such as 2D/3D edges, corners, textures (e.g., surface images or designs), or the like, from the image data 510. The detection module 502 can compare the extracted features to the registration records 232 of FIG. 2 to recognize or identify the registered objects depicted in the image data 510. The detection module 502 can further identify locations of one or more of the objects (e.g., the identified registered object) depicted in the image data 510. For example, the detection module 502 can identify/validate that a set of edges belong to a particular object while other edges likely belong to other/obstructed objects. The detection module 502 can generate a detection result (e.g., an initial result 512) for each detected object. The detection result can include an identity of the detected object, a location/pose of the detected object, and/or other details regarding the detected object.

The detection module 502 can include an auto-registration module 522 that is configured to automatically (e.g., without user input) register unrecognized and/or unregistered objects. For example, the detection module 502 can determine that (1) a set of edges satisfy one or more predetermined conditions to be considered an object (e.g., an exposed or an accessible object) but (2) one or more physical traits of the object does not sufficiently match with corresponding traits of registered object as reflected in the registration records 232. The auto-registration module 522 can automatically create a registration record for the unrecognizable or unregistered object using one or more of the computational results, such as a portion of the image data 510 reflecting visual characteristics of the object, one or more dimensions of the object, or the like. In some embodiments, the detection module 502, the auto-registration module 522, or a combination thereof can use information obtained during the transfer of the object to update the detection result and/or create/update a new registration record. Details regarding the updates are described below.

The planning module 504 can process the detection results received from the detection module 502 to derive motion plans for the detected objects. For example, the planning module 504 can identify the start location, the task location, the package travel path, the corresponding maneuvers, the corresponding settings/commands/timings, or a combination thereof for transferring each of the detected objects. In some embodiments, the planning module 504 can start from the task location and iteratively/incrementally advance and consider a new location toward the start location to derive the motion plan. Accordingly, the planning module 504 can generate an initial motion plan 514 for each of the initial detection result 512.

The implementation module 506 can process the motion plans (e.g., the initial plan) received from the planning module 504 to implement the transfer of the corresponding objects. The implementation module 506 can interact with the robotic arm system 132 for the plan implementation. For example, the implementation module 506 can generate and send control data 516 (e.g., commands and/or settings) that correspond to the motion plan, and the robotic arm system 132 can execute the motion plan according to the control data 516. Based on executing the motion plan, the robotic arm system 132 can transfer the corresponding object.

The robotic arm system 132 may provide implementation feedback 518 that include one or more measurements obtained during transfer of the object. For example, the robotic arm system 132 can measure the weight, the torque measurement, and/or the height measurement (e.g., profile image) after implementing an initial portion of the motion plan, such as after grasping and lifting the targeted object. The robotic system 100 can use the implementation feedback 518 to send the measurement(s) or derivations thereof to the implementation module 506 and/or the detection module 502. In some embodiments, the derivations can include such as (1) an estimated CoM location derived from the torque measurement or (2) an object height derived from the profile image. In some embodiments, the implementation module 506 and/or the robotic arm system 132 can pause the transfer while the implementation module 506 and/or the detection module 502 verifies the detection results. In other embodiments, the implementation module 506 and/or the robotic arm system 132 can implement an initial displacement (e.g., lift and/or lateral movement of the package) to obtain the measurement and then return/re-place the package until the detection result and the motion plan is verified.

The robotic system 100 can receive the implementation feedback 518 to verify the detection result. For example, if the detected object had matched a registered object, the robotic system 100 can compare the measured results to the corresponding characteristics stored in the registration record for the targeted package. When the mismatch in the actual measurement and the expected data exceed a predetermined condition, the robotic system 100 can determine that the initial detection result 512 was erroneous and/or initiate one or more error responses. For example, when the expected set of objects include one other similar (e.g., in appearance and/or size) object, the detection module 502 can generate an updated detection result 524 recognizing the targeted object as the other/similar object. Alternatively or additionally, the detection module 502 can generate the updated detection result 524 using the estimated geometry 198 of FIG. 4. The detection module 502 may classify the targeted object as an unregistered object and provide the estimated geometry 198 as the footprint. Also, the auto-registration module 522 can registered the unregistered object using the estimated geometry 198.

In response to identifying a detection error, the planning module 504 can use the updated result 524 to generate a replacement motion plan 520. The implementation module 506 can use the replacement motion plan 520 instead of the initial motion plan 514 to transfer the target object.

Operational Flow

Figure 6:
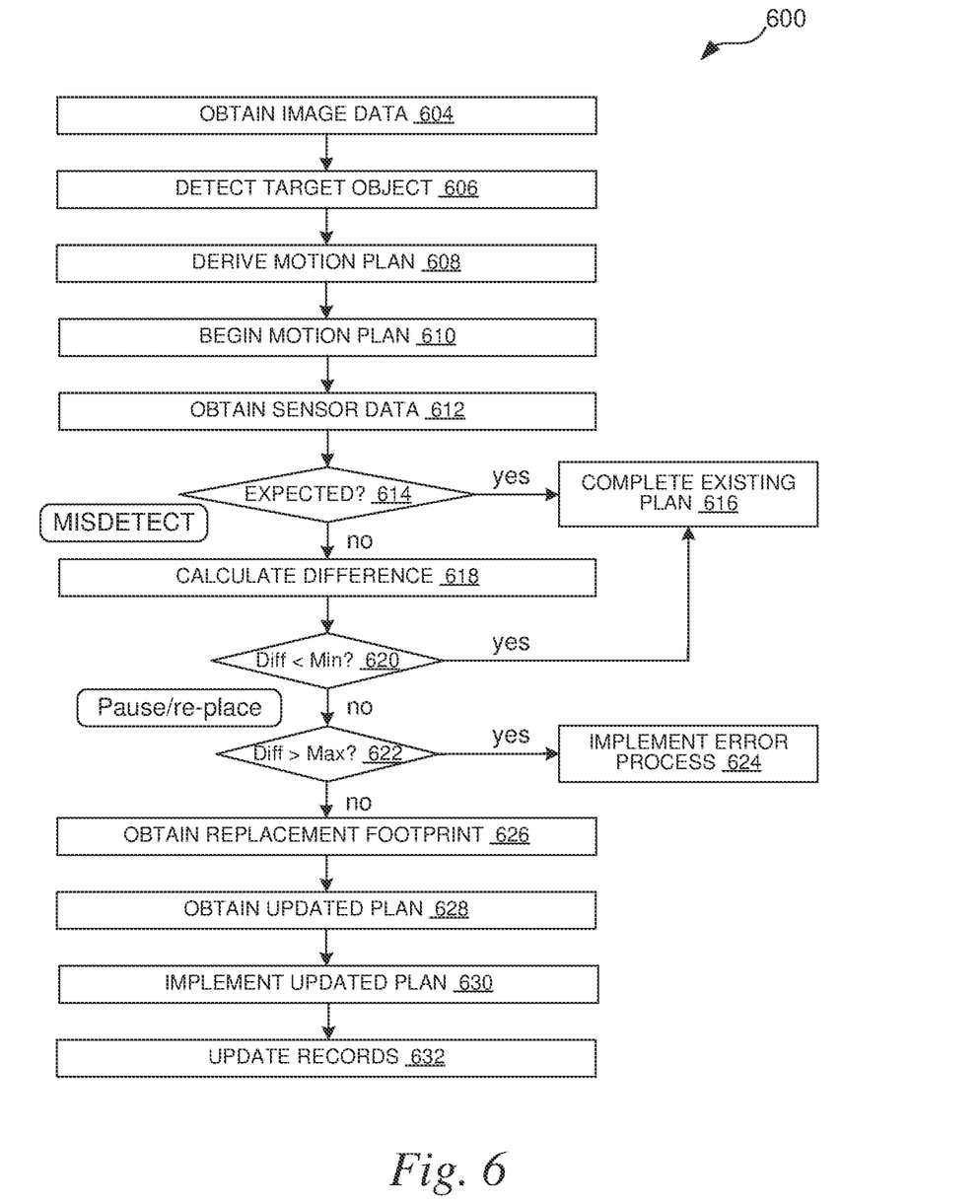
FIG. 6 is flow diagram for operating a robotic system in accordance with one or more embodiments of the present technology.

FIG. 6 is a flow diagram of a method 600 for operating a robotic system (e.g., the robotic system 100 of FIG. 1) in accordance with one or more embodiments of the present disclosure. The method 600 can be for determining and responding to misdetection of target objects. The method 600 can be implemented based on executing the instructions stored on one or more of the storage devices 204 of FIG. 2 with one or more of the processors 202 of FIG. 2. In implementing the motion plan and/or the method 600, the processors 202 can send the motion plan or an associated set/sequence of commands/settings to the robotic unit(s) (e.g., transfer assembly 104 of FIG. 3 and/or the end effector 140 of FIG. 3. Accordingly, the transfer assembly 104 and/or the end effector 140 can execute the motion plan to grasp and transfer the packages.

At block 604, the robotic system 100 can obtain image data (e.g., 2D and/or 3D imaging results, such as the image data 510 of FIG. 5). The robotic system 100 can obtain the image data 510 from the imaging system 160 of FIG. 3. The obtained image data 510 can depict objects or packages (e.g., the stack 165 of FIG. 3) at the start location, similar to the pickup environment 163 FIG. 3. In some embodiments, the obtained image data can correspond to a top view of the packages.

At block 606, the robotic system 100 can detect the target object based on analyzing the obtained image data 510. The robotic system can generate the detection result, such as the initial result 512 of FIG. 5. For example, the robotic system 100 can detect edges (via, e.g., Sobel filter) and identify corners or junctions between edges to determine continuous surfaces. The continuous surfaces can be used to estimate the package location and/or identification. The robotic system 100 can comparing surface image or the texture of the areas to corresponding data of registered objects in the registration records 232 to identify or recognize the packages. Alternatively or additionally, the robotic system 100 can measure and/or calculate dimensions (e.g., lengths and widths) of the determined surfaces. The resulting dimensions can be compared to corresponding data in the registration records 232 to identify the packages. The robotic system 100 can use the determined identity, location, and/or dimensions of the surface to generate the detection result when the analyzed texture and/or dimensions depicted in the image data 510 matches corresponding traits of a registered object. In other words, the robotic system 100 can generate the detection result by mapping traits of a matching registered object to the matching portions of the image data.

At block 608, the robotic system 100 can derive one or more motion plans. The robotic system 100 can use the planning module 504 of FIG. 5 (e.g., a device/system separate from the detection module 502, the implementation module 506 of FIG. 5, and/or the controller 109 of FIG. 1). In some embodiments, the robotic system 100 can process one motion plan for one package per each iteration. In other embodiments, the robotic system 100 can derive a plurality of motion plans for a corresponding subset of the packages.

The robotic system 100 can initiate the motion planning process based on providing the detection result from the detection module 502 to the planning module 504. The planning module 504 can use the received detection result to derive the motion plan(s), such as by estimating and evaluating a path for the target package and/or the robotic assembly. For example, the robotic system 100 can begin analysis from the package location (as indicated by the detection result) and derive a grip pose for the robotic assembly according to a predetermined set of rules (e.g., range of motion for joints, collision avoidance rules, or the like). The robotic system 100 can use the grip pose as a starting point and iteratively derive a travel segment that satisfies a predetermined set of rules, such as for avoiding collision and/or minimizing travel time. As a more specific example, the robotic system 100 can derive a first segment for lifting the package up until an expected collision or a desired height that corresponds to an expected height of the target package and an overall height of the stack or container walls. The robotic system 100 can derive a lateral segment from the end of the first segment toward the task location until an expected collision or the lateral location of the task location. The robotic system 100 can repeat the iterative process to derive a combination of path segments that avoids collisions and connects the starting location to the task location. In some embodiments, the robotic system 100 can derive the combination of segments in reverse order, such as from a derived placement pose of the package at the task location to the current pose of the package at the start location. The robotic system 100 may convert the combination of segments to corresponding commands and/or settings for operating the robotic unit or the components therein (e.g., actuators, motors, etc.). In some embodiments, the robotic system 100 can derive a set of candidate motion plans and a corresponding measure (e.g., an overall transfer time). The robotic system can derive the motion plan by selecting one or more plans that optimizes the corresponding measure.

At block 610, the robotic system 100 (via, e.g., the implementation module 506) can begin implementation of the derived motion plan. For example, the processor(s) 202, the implementation module 506, and/or the controller 109 can initiate implementation of the motion plan (e.g., the initial plan 514) by sending the motion plan, an initial portion thereof, and/or the corresponding commands/settings to the robotic unit (e.g., the transfer unit 104 of FIG. 1). The robotic unit can execute the received plan or the corresponding commands/settings, such as to grasp and lift the target package in transferring the package from the start location 114 to the task location 116.

At block 612, the robotic system 100 can obtain additional sensor data after or while implementing the motion plan or a first/initial portion thereof. For example, the robotic system 100 can obtain weight, height, and/or torque data (e.g., a weight vector and/or a different representation of the CoM 194b) from the corresponding sensors at or about the end-effector. Also, the robotic system 100 can obtain height data for the object, such as by lifting the object until a crossing/clearing event is detected at a line sensor located above the start location, and/or by obtaining and analyzing a side-view image of the stack.

In some embodiments, the robotic system 100 can derive an estimate of the actual CoM (e.g., the CoM 194b) based on the measured weight, torque, weight vector, or a combination thereof. For example, the robotic system 100 can use a predetermined process or equation that computes the estimated location of the CoM (e.g., relative to the grip location) based on the measured weight and a horizontal component (e.g., direction and/or corresponding magnitude) in the weight vector/torque measurement.

At decision block 614, the robotic system 100 can compare the obtained data to the corresponding record in the registration records 232 for the identified target object. For example, the robotic system 100 can compare the obtained weight data to the expected weight data in the registration records 232 for the identified target object. Also, the robotic system 100 can use the obtained weight and/or torque data and an actual grip location to estimate an actual CoM for the grasped target. The robotic system 100 can compare the actual CoM to the expected CoM for the identified target object. In some embodiments, the robotic system 100 can compare the obtained height to the expected height.

As an illustrative example, the robotic system 100 can be configured to derive the grip location centered over or positioned directly above the CoM according to the detection result. Accordingly, the robotic system 100 can compare the weight vector and/or the torque measurement from the end effector to a predetermined validation threshold to determine whether the package was accurately detected. When the estimate of the actual CoM is different than the expected CoM, the torque or the horizontal component of the weight vector can exceed the validation threshold, thus allowing the robotic system 100 to determine the misdetection. Alternatively or additionally, the robotic system 100 can use the difference between the expected values for weight, height, and/or lateral dimensions of the detected object and the measured height, weight, and/or lateral dimensions (via, e.g., an image captured after initially displacing the package) to test for the misdetection error.

If the obtained data matches the expected data, the robotic system 100 can complete the existing motion plan as illustrated in block 616. If the obtained data does not match the expected data, the robotic system 100 can determine a misdetection in the target/currently grasped package. At block 618, the robotic system 100 can calculate a measurement difference between the corresponding values for subsequent evaluation/processing. For example, the robotic system 100 can compare the measurement difference to a predetermined minimum threshold as illustrated in decision block 620. The minimum threshold can correspond to negligible differences (e.g., differences in the weights, the CoM locations, etc.) between the values expected for the detected object and the actual real-time measurements corresponding to the package. The minimum threshold can be for deciding continued implementation of the existing/initially provided motion plan. Accordingly, when the measurement difference is below such minimum, the robotic system 100 can continue/complete implementation of the existing motion plan despite the detected misdetection of the package as illustrated in block 616.

When the measurement differences are substantial (e.g., greater than the minimum and not negligible), the robotic system 100 can perform one or more automatic responses before or in preparation for further remedial responses, such as for deriving and implementing an alternative/replacement motion plan. In some embodiments, the robotic system 100 (via, e.g., the controller 109 and/or the implementation module 506) can pause the implementation of the initial motion plan in response to the misdetection. In other embodiments, the robotic system 100 (via, e.g., the controller 109 and/or the implementation module 506) can implement an automatic replacement operation for sufficient measurement differences. For example, the controller 109 can track a progress along the initial motion plan by storing the performed commands/settings and/or the traversed portions of the motion plan. The controller 109 can implement the automatic replacement operation by reversing the stored progress, such as by implementing the stored commands/settings in opposite directions and/or in reverse order. Additionally or alternatively, the controller 109 can release the grasped package following an initial lift. Accordingly, the controller 109 can re-place the package at the start location in preparation for deriving and implementing an alternative/replacement motion plan.

In determining the appropriate response to the misdetection, the robotic system 100 can further compare the measurement difference to a predetermined maximum threshold as illustrated in decision block 622. The maximum threshold can correspond to a limit in recoverable error, such as in reimplementing motion planning. When the measurement difference exceeds the maximum threshold, the robotic system 100 can implement an error process as illustrated in block 624. Some examples of the error process can include releasing or re-placing the target at the target package, notifying a human operator, or the like.

For certain types of recoverable misdetections (not shown), the robotic system 100 may dynamically adjust and complete the initially provided motion plan. For example, the robotic system 100 can use the controller 109 and/or the implementation module 506 to dynamically adjust one or more aspects of the initially provided motion plan, without using the planning module 504, to derive the replacement motion plan. Some examples of the dynamic adjustment can include (1) the end effector/package height by at least the calculated height difference and/or (2) the speed according to a weight difference and according to a predetermined method/equation.

In responding to the addressable misdetections, the robotic system 100 (via, e.g., the controller 109 and/or one of the modules illustrated in FIG. 5) may derive a replacement footprint using the obtained actual sensor data as illustrated in block 626. For example, the robotic system 100 can derive the estimated geometry 198 of FIG. 4, such as using the actual CoM and the grip location as described above and/or one or more corners detected from the image data (e.g., 3D image). The robotic system 100 can derive the estimated geometry 198 by expanding or shrinking the initial footprint so that the actual/measured CoM is in the center portion of the estimated geometry 198. For example, the robotic system 100 can use one of the 3D corners and the actual CoM as reference points to generate a straight line and estimate an opposite corner located along the straight line. The robotic system 100 can estimate the corner location as opposite and equal distance away from the CoM in comparison to the reference 3D corner. The robotic system 100 can extrapolate boundaries that (1) intersect at right angles at the opposing corners, (2) define a rectangular shape, and (3) enclose the actual CoM to derive the replacement footprint.

At block 628, the robotic system 100 can dynamically derive (e.g., after partial implementation of the initial motion plan, such as while the plan is paused or negated as described above) an updated motion plan (e.g., the replacement motion plan 520 of FIG. 5). The robotic system 100 can derive the replacement motion plan 520 using the obtained actual sensor data and/or the replacement footprint. In some embodiments, for example, the controller 109 and/or the implementation module 506 can analyze the implementation feedback 518 and obtain the replacement plan based on sending a request (e.g., the implementation feedback 518 of FIG. 5) for the replacement to the planning module 504. The request can include the actual sensor data and/or the replacement footprint. In other embodiments, the planning module 504 can receive and analyze the implementation feedback 518 and/or derive the replacement footprint. Subsequently, the planning module 504 can derive the replacement motion plan 520 according to the received request or the analysis results. For example, the planning module 504 can derive the replacement motion plan 520 similarly as described above but using the replacement footprint, the estimate of the actual CoM, the measured dimensions (e.g., height and/or lateral dimensions) the measured weight, etc. In deriving the replacement motion plan 520, the planning module 504 can effectively assume that the package is an unregistered object different from or unrelated to the registration record corresponding to the initial detection result. As a result, the planning module 504 can derive the replacement motion plan 520 that corresponds a replacement grip location, a replacement grip strength (e.g., a new number of suction cups for engaging the package), a replacement transfer height, a replacement transfer speed, or a combination thereof different than respective components of the initial motion plan. Depending on the default response, the planning module 504 can derive the replacement motion plan 520 for beginning at the start location for the re-placed package or for beginning from the paused location.

In some embodiments, the planning module 504 can derive the updated motion plan by accounting for other error modes (e.g., double pick, such as when two adjacent packages are inadvertently grasped by the end-effector) using for the enlarged replacement footprint. Also, when actual height is not initially obtained, the robotic system 100 can derive the updated motion plan to include maximum lift height that corresponds to a maximum height allowed by the robotic unit and/or a maximum height/dimension amongst the registered packages in the registration records 232. In some embodiments, the robotic system 100 can place the object at a predetermined area designated for unexpected packages. The planning module 504 can derive the replacement motion plan 520 to include instruction for regripping the package centered over the estimate of the actual CoM location instead of an initial grip location associated with the initial motion plan.

The implementation module 506 can subsequently receive the replacement motion plan 520 from the planning module 504 as a response to the request. At block 630, the robotic system 100 can implement the updated motion plan. In other words, the implementation module 506 can implement the replacement motion plan 520 instead of the initial motion plan 514 or remaining portions thereof to transfer the package to the task location 116. The robotic system 100 can implement the updated motion plan without notifying or involving the human operator. Accordingly, the robotic system 100 can implement an automated response to the package misidentification, thereby completing the task without human intervention.

At block 632, the robotic system 100 can update the registration records 232 based on the misidentified object. In some embodiments, the robotic system 100 can create a new record for the grasped/transferred package in addition to or as a replacement for the record associated with the initial detection. The robotic system 100 can include the actual sensor data and/or the corresponding processing result, such as the obtained weight, the obtained actual height, the actual CoM, and/or the estimated geometry 198 in the new record. In other embodiments, the robotic system 100 can update the existing record for the initially identified package, such as by replacing the weight, the height, the lateral dimensions, the CoM, or the like with the actual sensor data and/or the corresponding processing result.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A method of operating a robotic system, the method comprising:
    initiating implementation of an initial motion plan that is derived based on an initial detection result, wherein the initial motion plan is for transferring the package from a start location to a task location;
    obtaining additional sensor data during implementation of the initial motion plan;
    determining a misdetection when a difference between the additional sensor data and a registration record corresponding to the initial detection result is detected,
    in response to determining the misdetection, dynamically deriving a replacement motion plan based on the obtained additional sensor data; and
    initiating implementation of the replacement motion plan instead of a remaining portion of the initial motion plan for transferring the package to the task location.

2. The method of claim 1, further comprising:
    deriving a replacement footprint based on the obtained additional sensor data, wherein
        the replacement motion plan is derived based on the replacement footprint instead of dimensions in the registration record.

3. The method of claim 2, wherein:
    the additional sensor data includes a measurement for estimating a Center-of-Mass (CoM) location of the package; and
    the replacement footprint is derived with the CoM location estimate at a center portion of the replacement footprint.

4. The method of claim 3, wherein:
    the additional sensor data includes a weight vector or a torque measurement provided by a robotic unit executing the initial motion plan to transfer the package;
    further comprising:
        estimating the CoM location based on the weight vector.

5. The method of claim 3, wherein the replacement motion plan includes instructions to regrip the package over the CoM location instead of an initial grip location associated with the initial motion plan.

6. The method of claim 1, wherein:
    the additional sensor data includes a measured weight of the package; and
    the replacement motion plan is derived based on the measured weight instead of a weight indicated by the registration record.

7. The method of claim 1, wherein:
    the additional sensor data includes a measured height of the package; and
    the replacement motion plan is derived based on the measured height instead of a height indicated by the registration record.

8. The method of claim 1, further comprising:
    updating the registration records, including automatically replacing a recorded trait within the registration record with the additional sensor data.

9. The method of claim 1, further comprising:
    updating the registration records including automatically registering the package by creating a new registration record with the additional sensor data, wherein the new registration record is in addition to the registration record corresponding to the initial detection result.

10. The method of claim 1, further comprising:
    pausing implementation of the initial motion plan when the additional sensor data deviates from a corresponding expected trait according to the registration record corresponding to the initial detection result;
    wherein
    the replacement motion plan is for transferring the package from a paused location and for replacing the second portion of the initial motion plan.

11. The method of claim 10, wherein:
    initiating implementation of the initial motion plan includes receiving the initial motion plan from and derived by an external planning module; and
    dynamically deriving the replacement motion plan includes dynamically adjusting the initial motion plan using a controller that is separate from the external planning module.

12. The method of claim 1, wherein:
    implementing, using a controller, an automatic replacement operation when the additional sensor data deviates from a corresponding expected trait according to a registration record associated with the initial detection result, wherein the automatic replacement operation includes reversing at least a part of an implemented portion of the initial motion plan and/or releasing the package for placing the package back at the start location without communicating with an external planning module;
    dynamically deriving the replacement motion plan includes:
        sending a request from the controller to the external planning module for the replacement motion plan, wherein the request includes the additional sensor data and is a result of and based on the automatic replacement operation, and
        receiving the replacement motion plan from the external planning module.

13. The method of claim 12, further comprising:
using the external planning module, deriving the initial motion plan based on the initial detection result, wherein the initial motion plan corresponds to an initial grip location, an initial transfer height, an initial transfer speed, or a combination thereof; and
using the external planning module, deriving the replacement motion plan based on the additional sensor data, wherein
the derivation of the replacement motion plan includes assuming that the package is an unregistered object different from the registration record corresponding to the initial detection result,
the replacement motion plan corresponds to a new grip location, a new transfer height, a new transfer speed, or a combination thereof different than respective components of the initial motion plan, and
the replacement motion plan is for transferring the re-placed package from the start location to the task location.

14. A robotic system comprising:
at least one processor;
at least one non-transitory memory including processor instructions that, when executed, causes the at least one processor to:
initiate implementation of an initial motion plan for transferring a package from a start location to a task location, wherein the initial motion plan is derived based on an initial detection result;
obtain additional sensor data during implementation of the initial motion plan;
determine a misdetection when a difference between the additional sensor data and a registration record corresponding to the initial detection result is detected;
in response to determining the misdetection, dynamically derive a replacement motion plan based on the obtained additional sensor data; and
initiate implementation of the replacement motion plan instead of a remaining portion of the initial motion plan for transferring the package to the task location.

15. A non-transitory computer readable medium including processor instructions that, when executed by one or more processors, causes the one or more processors to perform a method comprising:
initiating implementation of an initial motion plan for transferring a package from a start location to a task location, wherein the initial motion plan is derived based on an initial detection result;
obtaining additional sensor data during implementation of initial motion plan;
determining a misdetection when a difference between the additional sensor data and a registration record corresponding to the initial detection result is detected;
in response to determining the misdetection, dynamically deriving a replacement motion plan based on the obtained additional sensor data; and
initiating implementation of the replacement motion plan instead of the remaining portion of the initial motion plan for transferring the package to the task location.

16. The non-transitory computer readable medium of claim 15, wherein:
the misdetection is determined when a center-of-mass (CoM) location of the package, as determined from a torque vector, deviates from an expected CoM location of the package; and/or
the misdetection is determined when a grasp location relative to the package, as determined from the torque vector, deviates from an expected grasp location relative to the package;
the method further comprises:
deriving a replacement footprint based on the obtained additional sensor data, wherein
the replacement motion plan is derived based on the replacement footprint instead of dimensions in the registration record.

17. The non-transitory computer readable medium of claim 15, wherein:
the additional sensor data includes a measured weight and/or a measured height of the package; and
the replacement motion plan is derived based on the measured weight and/or the measured height instead of a weight or a height indicated by the registration record.

18. The non-transitory computer readable medium of claim 15, wherein the method further comprises:
pausing implementation of the initial motion plan when the additional sensor data deviates from a corresponding expected trait according to the registration record corresponding to the initial detection result, wherein
the replacement motion plan is for transferring the package from a paused location and for replacing the remaining portion of the initial motion plan.

19. The non-transitory computer readable medium of claim 15, wherein the method further comprises:
implementing, using a controller, an automatic replacement operation when the additional sensor data deviates from a corresponding expected trait according to a registration record associated with the initial detection, wherein the automatic replacement operation includes reversing at least a part of an implemented portion of the initial motion plan and/or placing the package back at the start location.

20. The non-transitory computer readable medium of claim 15, wherein the method further comprises:
updating registration records to include the additional sensor data for the package based on (1) creating a new registration record that represents the package instead of the registration record, the new registration record including the additional sensor data instead of a corresponding trait or (2) replacing the corresponding trait in the registration record with the additional sensor data.

* * * * *